(12) United States Patent
Quentin

(10) Patent No.: US 11,010,805 B2
(45) Date of Patent: May 18, 2021

(54) METHOD FOR PROCESSING AT LEAST ONE PIECE OF PAYMENT MEANS DATA, CORRESPONDING PAYMENT TERMINAL AND COMPUTER PROGRAM

(71) Applicant: INGENICO GROUP, Paris (FR)

(72) Inventor: Pierre Quentin, Enghien les Bains (FR)

(73) Assignee: INGENICO GROUP, Paris (FR)

( * ) Notice: Subject to any disclaimer, the term of this patent is extended or adjusted under 35 U.S.C. 154(b) by 28 days.

(21) Appl. No.: 16/317,683

(22) PCT Filed: Jul. 12, 2017

(86) PCT No.: PCT/EP2017/067648
§ 371 (c)(1),
(2) Date: Jan. 14, 2019

(87) PCT Pub. No.: WO2018/011322
PCT Pub. Date: Jan. 18, 2018

(65) Prior Publication Data
US 2019/0156388 A1    May 23, 2019

(30) Foreign Application Priority Data

Jul. 12, 2016 (FR) .................................. 1656692

(51) Int. Cl.
*G06Q 30/00* (2012.01)
*G06Q 30/06* (2012.01)
(Continued)

(52) U.S. Cl.
CPC ..... *G06Q 30/0615* (2013.01); *G06F 21/6254* (2013.01); *G06Q 20/383* (2013.01);
(Continued)

(58) Field of Classification Search
CPC ....................................................... G06Q 30/00
See application file for complete search history.

(56) References Cited

U.S. PATENT DOCUMENTS

2007/0214037 A1\* 9/2007 Shubert ................ G06Q 20/385
705/7.32
2014/0164111 A1\* 6/2014 Rodriguez ......... G06Q 30/0255
705/14.53
(Continued)

FOREIGN PATENT DOCUMENTS

WO        2015044693 A1      4/2015

OTHER PUBLICATIONS

Hogenson, Kate, "Multi-tender Loyalty Programs: Should retailers reward all forms of payment?", Kobie.cpm, dated Nov. 24, 2015. (Year: 2015).\*

(Continued)

*Primary Examiner* — Mark A Fadok
(74) *Attorney, Agent, or Firm* — David D. Brush; Westman, Champlin & Koehler, P.A.

(57) ABSTRACT

A method for processing at least one piece of payment method data, implemented within a payment terminal having a secured processor and a secured processing memory. Such a method includes: obtaining at least one piece of data representing a payment method used to carry out a transaction, called a piece of payment method data; anonymizing the piece of payment method data, delivering a piece of current anonymous identification data; and transmitting the piece of current anonymous identification data to an application for processing loyalty data.

14 Claims, 2 Drawing Sheets

Figure 1:
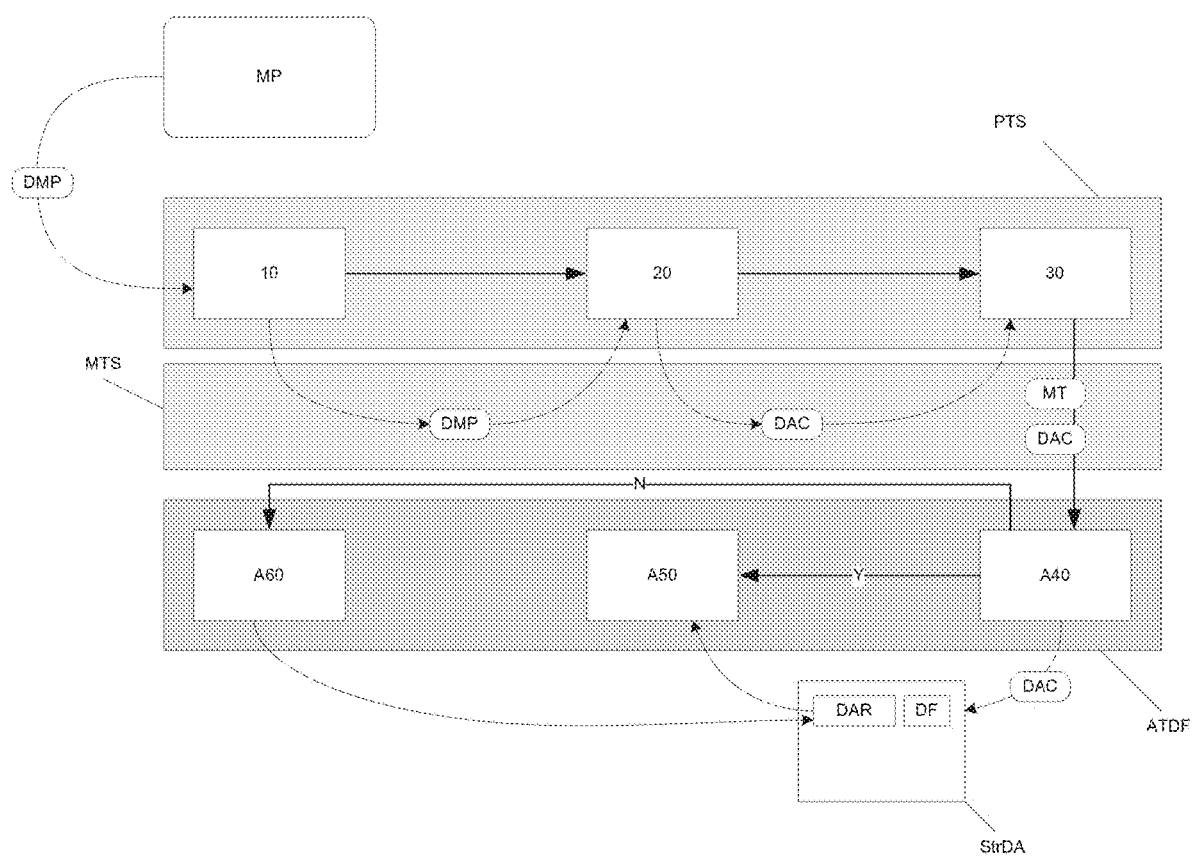

(51) Int. Cl.
*G06F 21/62* (2013.01)
*G06Q 30/02* (2012.01)
*G06Q 20/38* (2012.01)
*H04L 9/32* (2006.01)

(52) U.S. Cl.
CPC ......... *G06Q 20/387* (2013.01); *G06Q 20/389* (2013.01); *G06Q 30/0226* (2013.01); *H04L 9/3236* (2013.01)

(56) References Cited

U.S. PATENT DOCUMENTS

| | | | |
|---|---|---|---|
| 2014/0222668 A1 | 8/2014 | Wall et al. | |
| 2014/0258121 A1* | 9/2014 | Raman | G06Q 20/322 705/44 |
| 2014/0297385 A1* | 10/2014 | Ryan | G06Q 30/0615 705/14.27 |
| 2014/0297472 A1* | 10/2014 | Ryan | G06Q 30/0615 705/26.42 |
| 2014/0297556 A1* | 10/2014 | Ryan | G06Q 30/0615 705/346 |
| 2015/0088752 A1 | 3/2015 | Howe | |
| 2016/0379241 A1* | 12/2016 | Badger | G06Q 30/0226 705/14.27 |

OTHER PUBLICATIONS

Cardlogic, "Loyalty and stored value cards", Card logic Corp., dated Circa 2004. (Year: 2004).*
International Search Report dated Sep. 19, 2017 for corresponding International Application No. PCT/EP2017/067648, filed Jul. 12, 2017.
Written Opinion dated Sep. 19, 2017 for corresponding International Application No. PCT/EP2017/067648, filed Jul. 12, 2017.
International Preliminary Report on Patentability dated Feb. 7, 2018 for corresponding International Application PCT/EP2017/067648, filed Jul. 12, 2017.
English translation of the International Preliminary Report on Patentability dated Feb. 7, 2018 for corresponding International Application No. PCT/EP2017/067648, filed Jul. 12, 2017.

* cited by examiner

METHOD FOR PROCESSING AT LEAST ONE PIECE OF PAYMENT MEANS DATA, CORRESPONDING PAYMENT TERMINAL AND COMPUTER PROGRAM

CROSS-REFERENCE TO RELATED APPLICATIONS

This Application is a Section 371 National Stage Application of International Application No. PCT/EP2017/067648, filed Jul. 12, 2017, which is incorporated by reference in its entirety and published as WO 2018/011322 A1 on Jan. 18, 2018, not in English.

1. FIELD OF THE INVENTION

The invention pertains to the field of the recurrent processing of anonymized data. The technique relates more particularly to the recurrent management of anonymized customer data in the context of the processing of loyalty or loyalty programs.

2. PRIOR ART

From time immemorial, gaining customer loyalty has been a means by which merchants ensure regular income and thus make their businesses prosper and live long. For many years now, however, it has been noted that there are two major types of technologies that are used to ensure a certain type of fidelity from customers. The first most basic type lies in the use of paper publishing tools: this mode typically uses a loyalty card, which may or may not be stampable so that when a customer goes through a cash desk, he can receive one or more stamps on his card depending on the amount of his purchase. The stamped loyalty card is from time to time matched with the dispatch of reduction coupons or loyalty coupons to customers, generally by post.

The second type of technology, which is the most advanced type, makes full use of existing solutions in technological communications. This second type relies for example on a loyalty card associated with a unique number (for example an identifier), this unique number being used extensively with the customer's details (email address, phone number, social networks) to propose to the customer, through various communications channels, not only a management of loyalty programs but also a transmission of commercial offers and reduction coupons. Thus, the transmission of this information is done by email, SMS or again by using "in-app messaging", a technology in which notifications are transmitted to an application installed on a smartphone. More recently, the integration of loyalty management into smartphones has been improved by means of wallets.

Thus, the industry has seen a considerable quantity of publications on the use of mobile wallet components such as "Google Wallet"™ and Apple™ "Passbook"™. Defined as efficient mobile solutions used to reward customer loyalty, there is no question as to why these applications are becoming increasingly popular.

Thus, under pressure from users, ever more eager to have simple and practical solutions at their disposal, the major actors in the shopping business have mobilized to provide solutions suited to their customers. In the United States, Walgreens™ has become a model for these large shopping business groups. These technologies however are being adopted slowly and gradually. The deployment of such customer loyalty solutions is complicated and (very) costly.

Besides, although users wish to have these services available to them, they are nevertheless concerned about problems of security that may arise especially when data about their payment means is associated with their loyalty data, as is increasingly becoming the case.

As a result, a substantial proportion of merchants are today moving away from these modern solutions of loyalty management: this is the first category of merchants presented, namely the small, independent, neighborhood shopkeepers and tradesmen who are not affiliated to the big shopping business groups. Indeed, the amounts to be invested to obtain modern loyalty solutions are far beyond the financial capacities of these merchants. The majority of these merchants therefore still use the traditional technology in which the customer is provided with a "paper" loyalty card, that generally has to be stamped. To cope with these needs, a certain number of publishers and salesmen have emerged. They offer merchants the use of their own websites in order to carry out "marketing" campaigns that exploit certain possibilities offered by smartphone wallets. Essentially, these publishers propose a coupon-transmission solution through wireless transmission techniques by which the merchant can disseminate offers of reductions from time to time. Other publishers propose a fuller range of offers. These offers however require the availability of personal information on customers (such as electronic mail addresses and phone numbers). Now, such information is not necessarily available to the neighborhood merchant.

There is therefore a need to provide this type of merchant with a loyalty solution that, on the one hand, makes use of the technical possibilities offered by communications terminals and, on the other hand, is simple and costs little to the merchant.

3. SUMMARY OF THE INVENTION

The invention does not entail these problems of the prior art. More particularly, the invention provides a simple solution to the problems identified here above. Indeed, the present technique enables the simple and efficient management of loyalty policies proper to the independent merchant without its being necessary for him to have extensive information on his customers and without its being necessary to subscribe to costly third-party solutions.

More particularly, the present invention relates to a method for the processing, within a payment terminal, of a piece of data representing a payment means, said method comprising a step for obtaining, at the time of the payment made by means of the payment terminal, of a piece of data representing the payment means used and a step for comparing this piece of data representing the payment means used with a plurality of previously obtained data of the same type.

More particularly, in one embodiment, the data representing the payment means used is obtained following an implementation of a specific processing operation within a secured processor of the payment terminal.

According to one particular characteristic, the data representing the payment means used is transmitted, by means of a dedicated interface, to a general-purpose processor of the payment terminal. As a result, said step for comparing this piece of data, representing the payment means used, with a plurality of previously obtained data of the same type is carried out at the general-purpose processor.

In addition to the data representing the payment means, the general-purpose processor is also capable of obtaining various items of data relating to a transaction, for example the amount, the date and the time.

More particularly, the present technique relates to a method for processing at least one piece of payment means data, a method implemented within a payment terminal comprising a secured processor and a secured processing memory. Such a method comprises:
- a step for obtaining at least one piece of data representing a payment means used to carry out a transaction, called a piece of payment means data;
- a step for anonymizing said piece of payment means data, delivering a piece of current anonymous identification data;
- a step for transmitting said piece of current anonymous identification data to an application for processing loyalty data.

Thus, it is possible to carry out a management of customer loyalty in small-scale businesses and to do so without having available a large loyalty management infrastructure and to do so anonymously (i.e. without requiring personal information from the customer). It is vital that the anonymous nature of this loyalty be understood because no other system offers this type of management loyalty.

According to one particular characteristic, the step for transmitting said piece of anonymous identification data to the application for processing loyalty-promotion data is accompanied by the transmission of a piece of data representing a transaction amount.

Thus, the application for processing loyalty is capable of managing the merchant's loyalty-promotion policies in a simple manner: either by totalizing the amounts of purchases or by totalizing the number of purchases, or by combining these two totalizing approaches, or by any other loyalty policy.

According to one particular embodiment, the application for processing loyalty-promotion data is executed on the payment terminal and the step for transmitting the piece of current anonymous identification data includes the transmission of the anonymous identification data to a general-purpose payment terminal processor.

Thus, the general-purpose processor is capable of carrying out processing operations that are heavier consumers of computation time and memory. It can especially make faster searches in databases or in complex file structures.

According to one particular embodiment, the step for anonymizing said piece of payment means data comprises:
- a step of application, by the secured processor, of a hash processing operation; and
- an optional step of application, by the secured processor, of a cryptographic processing operation.

Thus, it is not possible to obtain payment data from the identifier. It is thus ensured that the payment data will not be used subsequently. The unique character of the identifier is also ensured. Complementarily, the cryptographic processing operation implements a public key of the payment terminal: this means that it is not possible for one and the same user to have an identical identifier with two different merchants. Thus, the anonymity of the data exchanged is preserved.

According to one particular embodiment, the method comprises the processing of loyalty data by the application for processing loyalty data, said processing comprising:
- a step of searching, within a data structure, for a piece of reference anonymous identification data corresponding to the piece of current anonymous identification data; and
- when said step of searching delivers a positive result, a step for updating a piece of loyalty data associated with the piece of current anonymous identification data;
- when the step of searching delivers a negative result, a step of creation, within the data structure, of a piece of loyalty data associated with the piece of current anonymous identification data.

Thus, the processing implemented is simple and efficient.

According to one particular embodiment, said method comprises a step for transmitting loyalty data comprising:
- a step of transmission, to the secured processor, of the current anonymous identification data and of at least one piece of data representing loyalty;
- a step of creation, by the secured processor, of a container comprising a container identifier and data derived from the piece of current anonymous identification data and from said at least one piece of data representing loyalty;
- a step of transmission of said container to a communications terminal.

According to one particular characteristic, said step of transmission of loyalty data comprises:
- a step of reception, from the communications terminal, of a piece of data for identifying said communications terminal; and
- a step for updating a recording of a loyalty data structure associated with the piece of current anonymous identification data, comprising the association of the piece of data for identifying said communications terminal with the piece of current anonymous identification data.

According to one particular embodiment, the method further comprises, subsequently to the step of transmission of the piece of current anonymous identification data, a step for printing out a payment receipt comprising at least one piece of loyalty data.

Thus, the payment terminal can for example print out a loyalty card already stamped which, in a certain way, acts as a proof of loyalty for the customer (as if he himself had a loyalty card).

The invention also proposes a payment terminal of the type comprising a secured processor and a secured processing memory. Such a terminal comprises means for implementing the technique described here above. Such a terminal comprises especially:
- means for obtaining at least one piece of data representing a payment means used to make a transaction, called a piece of payment means data;
- means for anonymizing said piece of payment means data, delivering a piece of current anonymous identification data;
- means for transmitting said current anonymous identification data to an application for processing loyalty data.

According to a preferred implementation, the different steps of the methods according to the invention are implemented by one or more software programs or computer programs comprising software instructions that are to be executed by a data processor of a relay module according to the proposed technique, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component as to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, a smart card, a memory card, an electronic board for the execution of firmware etc.

Each component of the system described here above can of course implement its own software modules.

The different embodiments mentioned here above can be combined with one another to implement the invention.

4. FIGURES

Figure 2:
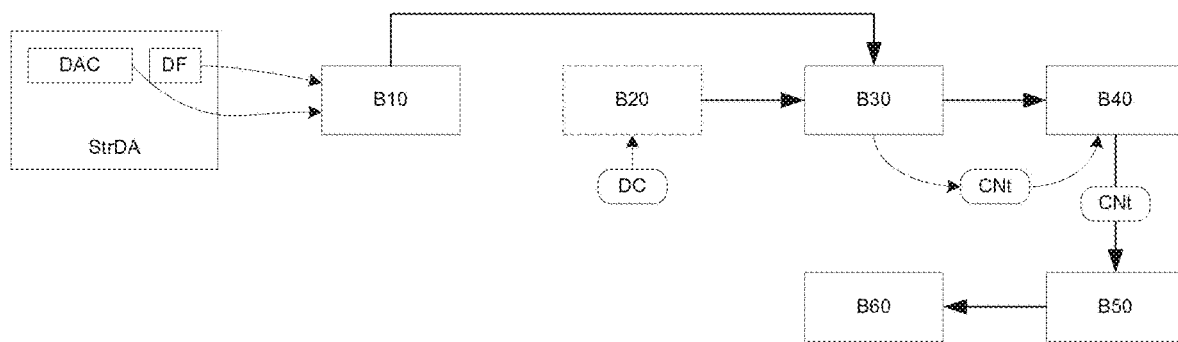
Figure 3:
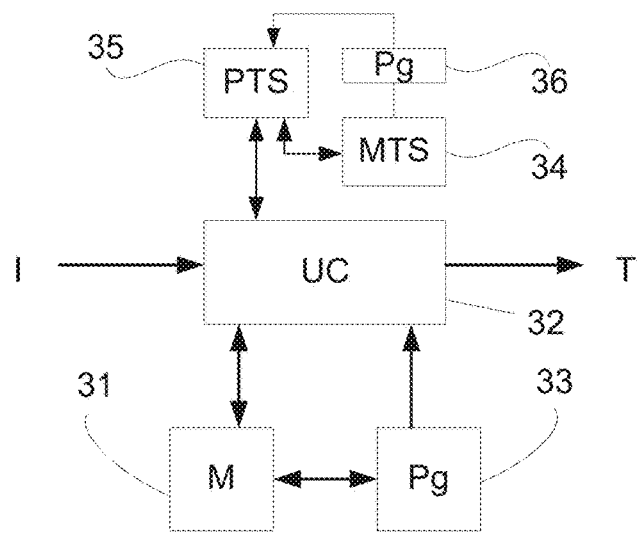

Other features and advantages of the invention shall appear more clearly from the following description of a preferred embodiment, given by way of a simple illustrative and non-exhaustive example and from the appended drawings, of which:

FIG. 1 is a block diagram of the proposed technique;

FIG. 2 presents the transmission of a loyalty "pass" to a communications terminal;

FIG. 3 describes a payment terminal according to one particular embodiment.

5. DESCRIPTION

5.1. General Principle

The general principle of the proposed technique consists in carrying out a processing operation, within a payment terminal, for processing data known as loyalty or loyalty data. Such a processing operation, the nature of which is not administrative or commercial (as shall be demonstrated here below), enables the merchant to reliably and efficiently manage the data involving the users' payment means: the processing of this data must be done in a secured manner so that they (the pieces of data) cannot be stolen or usurped. The technique presented here below, as indicated here above, is based on the observation that small-scale merchants (bakers, florists, independent garage-owners, etc.) do not have shopping-business platforms for managing customer loyalty as do for example large department stores.

To overcome these problems, it is proposed to manage an adapted loyalty program using the merchant's payment terminal, this terminal having characteristics that are used to carry out reliable and secured processing of these pieces of data.

Such management raises two major technical problems which are, on the one hand, the processing of data by the payment terminal and, on the other hand, the relative absence of data available to the merchant to identify his customers. To illustrate this second problem, for example, a baker regularly serves customers whom he recognizes but does not know. Possibly, in the case of loyal customers, the baker may know their surnames, first names and also their telephone numbers (for example when they make an order for a specific item). However, it is less frequent for him to know his customer's address or even email address. The problem that the shop-keeper faces also relates to the fact that many of his customers are generally satisfied with the relationship they have with their neighborhood shop-keeper. However, they are far less inclined to entrust him with personal information: this is logical because customers already have a neighbor-to-neighbor relationship with the shop-keeper do not necessarily want him to know more about their private lives. Thus, paradoxically, it is the shop-keeper's proximity to his customers that is his main obstacle to setting up an efficient loyalty program. This is why loyalty cards generally take the form of paper and are anonymous.

To overcome these two technical problems themselves resulting from the problems explained here above, the inventors have had the idea of basing their approach on anonymous identification data to process loyalty program data within a payment terminal. More particularly, a piece of anonymous identification data is a piece of data that, on the one hand, does not make it possible to know the identity of the user from whom it data comes and secondly is singular enough to represent a unique identifier of the user. More particularly, in the context of the present invention, a user's the anonymous identification data results from a processing operation carried out by the merchant's payment terminal. In one specific embodiment, such processing is carried out on the basis of at last one piece of data present in the payment means used by the customer. In one embodiment, such a processing operation is carried out on the basis of at least one piece of data of the bank card used by the customer to make his purchase: card number, date of validity, surname, first name, visual verification code.

Indeed, the inventors have noted that it is becoming increasingly frequent to use a bank card to make payments with shop-keepers and to do so for even small amounts. For example, with the development of contactless payment, it is becoming very frequent to use this mode of payment for articles or services involving small sums (for example below a given ceiling, for example 20 €. Besides, the bank card is also the preponderant mode used to pay larger sums for goods and services. Now, the data contained in the payment card can be obtained equally well without contact as with contact (by the traditional insertion of the smartcard into the smartcard reader). It is therefore possible, whatever the technology used to make payment, to derive one and the same piece of anonymous identification data from these payment technologies. The is also the case when only the magnetic track of the card is used. Thus, such a piece of data can for example be obtained from the bank card number (also called a PAN) in the literature. A processing operation, for example a cryptographic processing operation, can make it possible, from this piece of data, to obtain a piece of anonymous identification data. More particularly, a hash algorithm can be implemented to deliver a piece of anonymous identification data. This hash algorithm can be coupled with an encryption algorithm to deliver an authentication code (MAC) acting as a piece of anonymous identification data. A signature can also be suitable for anonymizing data.

This piece of anonymous identification data is then used to make a search, within the payment terminal, for a correspondence with a piece of identical anonymous identification data. When this search delivers a positive result, a piece of loyalty data is updated. When this search delivers a negative result, a new entry is created and a piece of loyalty data is inserted. The loyalty data can represent a number of purchases or again a total purchase value.

In order to secure the entire process for managing loyalty and prevent the possibility of anonymous identification data being used to fraudulently obtain non-anonymized data, the proposed technology carries out an anonymization by using the cryptographic processor of the payment terminal (also called a secured processor). This cryptographic processor makes it possible to obtain a piece of anonymous identification data in full security, and to do so on the basis of a set of non-anonymized pieces of data that come into the possession of the terminal when a transaction is made. Indeed, the inventors have had the idea of carrying out the anonymizing processing operation when carrying out the transaction itself: during the processing of the transaction, the payment terminal comes into possession of bank card data to carry out this transaction. At the very least, it knows the bank card number and date of validity of this card. This means that, to implement a processing of loyalty data in a simple and secured way, it is more secure and faster to create the anonymous identification data at the time of the transaction itself. In fact, this creation is done subsequently to the confirmation of the transaction, using data that is still in the possession of the terminal (hence using data that the terminal has taken care to keep in its secured memory). In at least one embodiment, this creation is for example implemented in asking (by means of a request) the card for the signature or for authentication of data. The request is transmitted by the payment terminal. The card carries out a cryptographic processing operation on the basis of the data that it possesses. The payment terminal carries out a verification of the "signed" data received from the card.

In a complementary way, the cryptographic processing operation brings into play a public key of the payment terminal: the anonymous identification data is then unique to the payment terminal in question; it is therefore impossible for a user (customer) to have a same piece of anonymous identification data with two different merchants (whose terminals might implement the present technique).

The cryptographic processing is thus sheltered from third-party applications being executed on the non-secured general processor. This technique therefore makes it impossible for a fraudulent application to retrieve the user's bank card data. The pieces of anonymous identification data are transmitted to a loyalty application that is executed on the general processor of the payment terminal. Thus, this application is capable of carrying out loyalty management operations efficiently. Indeed, one of the characteristics of the general processor of the payment terminal is its ability to carry out computations and processing operations far more extensively than the secured processor which, by nature, has lower computation power and less available memory.

One complementary characteristic, as described here below, consists in transmitting this loyalty data to the customer. Indeed, depending on the embodiments implemented, it can be worthwhile to offer the customer an additional user experience. To do so, in addition to creating anonymized loyalty management data, a technique is proposed for transmitting a part of this data enabling the merchant to interact in a technically up-to-date manner with his customers.

In concrete terms, the inventors proposes two types of techniques for transmitting this data.

The first technique is basic: it consists in delivering the information on the payment slip printed out by the payment terminal. From a general viewpoint, this is not a major innovation in terms of data processing. However, in order not to excessively modify the customers' habits, the information displayed is modified. Indeed, traditionally, for example for large department stores or big shopping brand names, the loyalty data are actually constituted by an amount, generally a totalized amount, taking account of all the promotions from which the customer has benefited. This amount is recorded in euros (€), in dollars ($) or in any other currency. The inventors propose two variants alternatives to notify loyalty. These variants are appreciably different from the simple recording of an amount.

The first variant consists in printing out a representation of a loyalty card on the payment slip. This makes it possible to imitate the traditional stampable loyalty card and immediately know the benefits obtained by the customer. This print-out is simple to make and has the advantage of being understandable by one and all. More particularly, when the card is a card to be stamped, the print-out is done by printing out stamps representing purchases made with the merchant.

The second variant consists in printing out a 2D barcode (or QR code). This barcode comprises firstly the piece of anonymous identification data (associated with the customer within the payment terminal) and at least one piece of data associated with the merchant's loyalty program. In addition, this 2D barcode also comprises a merchant's identifier. Using this barcode, the user can carry out online tracking of his loyalty offers associated with the shops that he usually goes to and that have the present technique available to them. Such tracking is done for example in creating an account on an online tracking platform and logging in to this account and scanning the 2D barcode. The use of the (online) consultation platform can be done either through PC type computer or a smartphone or tablet type communications terminal (for example with a loyalty management application of the FidMe™ application type).

The second technique is presented further below and is based on an interaction between the payment terminal and a communications terminal (smartphone) of the user.

In a complementary way, the merchant can, at the end of transaction, ask for the customer to provide a surname, a first name or both in order to identify the customer in a more friendly manner. This however is optional and the general principle of the technique described does not require this information.

FIG. 1 describes the different steps implemented in the context of the present invention. The method of processing at least one piece of payment means data implemented within a payment terminal (TP) includes a secured processor (PTS) and a secured processor memory (MTS), a method characterized in that it comprises:

- a step for obtaining (10) at least one piece of data representing a payment means (MP), used to make a transaction, known as a piece of payment means data (DMP); as explained, it can be a card number for example;
- a step of anonymization (20) of said piece of payment means data, delivering a piece of current anonymous identification data (DAC); as explained, this piece of data can be converted by the payment terminal (in the form of a hashing or an encryption);
- a step of transmission (30) of said current anonymous identification data (DAC) to an application for processing loyalty data (ATDF); the ATDF application can be executed on a general-purpose processor of the payment terminal; this processor comprises an interface enabling reception of data from the secured processor (PTS).

In a complementary way, the transmission of the piece of current anonymous identification data (DAC) is accompanied by the application for processing loyalty data (ATDF).

The data then processed by the application for processing loyalty data (ATDF) and this processing comprises especially:

- a step of searching (A40), within a data structure (StrDA), for a piece of reference anonymous identification data (DAR) corresponding to the current anonymous identification data (DAC); and
- when the step of searching delivers a positive result, a step for updating (A50) a piece of loyalty data (DF) associated with the current anonymous identification data (DAC);
- when the step of searching delivers a negative result, a step of creating (A60); within the data structure (StrDA), a piece loyalty data (DF) associated with the current anonymous identification data (DAC).

Subsequently to this updating or to this creation, depending on the embodiments, a phase of communication with the customer is implemented, in order to send him loyalty information (as is presented here above and here below).

5.2. Virtual Loyalty Card

In addition to the method for processing anonymous data as presented here above, a technique for transmitting this data is also presented. This technique makes it possible, at the same time, for a merchant to have the loyalty codes related to the payment terminal that he is using and for the (merchant's) customers to have this loyalty program data available.

To this end, the security processor of the payment terminal is again implemented in an unexpected way to set up a link between the payment terminal and a communications device available to the customer. Besides, the secured environment of the customer's communications terminal (smartphone) can also be used. More particularly, the combined use of these cryptographic resources enables the customer to have available, within his smartphone, a sort of virtual loyalty card that is updated from the payment terminal.

More particularly, this data transmission technique is explained with reference to FIG. 2. At the end of the payment transaction, as explained here above, the loyalty management application of the payment terminal has recorded, in a data structure (StrDA) of the database type or flat file (text or XML) type, an association between a piece of anonymous identification data (DAC) coming for example from the payment means used by the customer and a piece of loyalty data (DF). The inventors have sought a way to inform the customer in a simple and efficient manner.

To this end, the inventors have had the idea of carrying out a transmission of data, through a communications channel available to the payment terminal, to a communications terminal (smartphone) of the customer. More particularly, this data transmission is addressed to a specific component of the communications terminal: the secured wallet. This component is traditionally used to receive payment data (payment cards). The inventors have had the idea of using this wallet to receive data coming from the payment terminal. To this end, the payment terminal builds a "pass". A "pass" is traditionally a "json" type of file comprising an identifier, text, one or more images and possibly a one-dimensional or two-dimensional barcode. However, for the needs of the present technique, the inventors have had the idea of diverting the use of this "pass". Indeed, rather than using it as a technique for conveying "values" (this is the case, for example, with reduction coupons used in passes, the inventors have had the idea of using the image of the pass as the representation of the loyalty card to be stamped. Thus, loyalty data is transmitted by using a management means present in the smartphones but this is done so as to display a piece of data in a form that is more conventional and more understandable by the greatest number.

The general method is the following:

- the loyalty management application installed in the payment terminal transmits (B10), to the secured component of this same payment terminal, the piece of anonymous identification data (DAC) and the data representing loyalty (DF) (for example the piece of loyalty data is a counter indicating a number of passages at the cash desk);
- in a complementary way, the application can also transmit (B20) a set of configuration data (DC) (logo, colors, text, shaping data) constituting the visual representation of a virtual loyalty card;
- the secured component receives this data and creates (B30) a secured "pass" type file: it first of all carries out a creation of an image representing a loyalty card using firstly the piece of loyalty data (DF) and secondly configuration data (DC) that it has received or that it possessed previously; it then creates the container (CNt) for the pass and encrypts this container; the container for the pass comprises a unique identifier (unique identifier of the pass): this identifier is for example created by the secured processor of the payment terminal using anonymous identification data; this is then a "derived" identifier; the identifier can also directly be the piece of anonymous identification data, although this solution has a lower degree of security;
- the payment terminal transmits (B40) this container (CNt) to the user's communications terminal (TC) (a smartphone); concretely, this transmission is carried out for example in making an NFC or Bluetooth file transfer with the user's smartphone; depending on the transmission interface used and various other parameters, this transmission can be done either by the secured processor or by the general processor; this transmission is accompanied, as the case may be, by an instruction for eliminating any "pass" that has the same identifier as the one that will be transmitted;

in a complementary way, during the transmission of the "pass" to the smartphone, a two-way communication can be implemented between the smartphone and the payment terminal: on this occasion, the payment terminal retrieves at least one piece of identification data of the communications terminal (it can for example be the IMEI or a hardware imprint of the communications terminal: for example a signature derived from a signature algorithm applied to a MAC address of the communications terminal or again directly a MAC address);

the payment terminal then, in this embodiment, retrieves the identifier of the customer's identification terminal: this terminal identifier is added to the input associated with the anonymous identification data: the communications terminal identifier then serves two purposes: making up for any changing of the user's payment means and making remote modifications in the "pass" that has just been installed; the communications terminal receives (B50) the container (CNt) and checks (B60) whether a "pass" corresponding to this container already exists in the memory: if this is the case, the existing "pass" is eliminated and the new "pass" takes the place of the old "pass".

5.3. Use of Other Payment Means

The general principle has been described on the basis of the use of a payment card (smart card, NFC payment or magnetic stripe). However, the technique described is not limited to this type of payment means. More particularly, at least three other cases can be taken into account:

the first case consists of a payment made by smartphone, using a contactless application (Android Pay™, Apple Pay™, etc.): this case is not fundamentally different from bank card payment because the same data are used; however, this case has one advantage in the context of a transmission of loyalty data to the smartphone because it does not require the user to use his smartphone in addition to the payment means; the second case consists of a payment made by check: this case does not raise any particular difficulty inasmuch as a payment by check enables the creation of a piece of anonymous identification data as in the first example; this piece of anonymous identification data is computed for example by applying a hash algorithm to the bank account number (IBAN); for the merchant, after to the payment, it is enough to enter the digits forming the IBAN into the fidelity application through the keypad of the payment terminal; the loyalty application then transmits these digits to the secured processor of the payment terminal which makes a cryptographic computation (hashing and if necessary encryption) from these digits and, in return, give the loyalty application the piece of anonymous identification data; in addition, with the check, the merchant has the customer's surname and first name and this data can also be added to the loyalty application;

the third case consists of a cash payment; in this third case, several possibilities are offered:

either the customer already has a loyalty account and therefore has already been associated with a piece of anonymous identification data: in this case, the merchant makes a search to try and identify this client; or it is the first time that the client has come and a piece of anonymous identification data therefore needs to be created; in this case, the creation is based on a piece of personal data of the customer, which is therefore hashed and encrypted in order to give a piece of anonymous identification data; however, the data obtained is marked as being temporary: this means that this piece of data will have to be replaced during a subsequent purchase by a piece of "regular" data, coming from a bank card or a payment application on smartphone; the customer's personal data can for example by a pair comprising a surname and a first name and/or a telephone number.

5.4. Merchant's Application

In order to adapt as closely as possible to the merchant's needs, we also describe an loyalty configuration application made available to the merchant either directly on the payment terminal or on a remote server that the payment terminal is capable of accessing.

This configuration application enables the merchant to set the rules for processing loyalty data. Essentially, this application makes it possible to define the type of loyalty card to be managed and the transaction amounts or the purchases involved in the computation of loyalty. It also makes it possible to define the type of virtual loyalty card to be managed (stampable card, card showing expenditure) and to define the modalities of offers. All these parameters are codified within a configuration file. This configuration file serves as a basis for the loyalty management application that is executed on the payment terminal. This file is either directly built within the payment terminal or transmitted to this terminal by means of the server to which the payment terminal is connected.

5.5. Other Features and Advantages

Referring to FIG. 3, we describe a payment terminal implemented to manage loyalty data locally according to the method described here above.

For example, the payment terminal comprises a memory 31 comprising a buffer memory, a general processor 32 equipped for example with a microprocessor and managed by a computer program 33, and a secured memory 34, a secured processor 35 managed by a computer program 36, these processing units implementing data-processing methods as described here above to carry out the processing of anonymous identification data obtained from the payment data used by customers in order to make their purchases from the merchant.

At initialization, the code instructions of the computer program 36 are for example loaded into a memory and then executed by the secured processor 35. The processor 35 inputs at least one piece of data representing a payment means and a piece of data representing a transaction amount. The secured processor 35 implements the steps of the data-processing method of the processing means according to the instructions of the computer program 36 to give the general processor 35 a piece of anonymous identification data and, as the case may be, a piece of data representing the transaction amount. The general processor 32 carries out a processing operation on the data to identify or create, within a database or a file, an input corresponding to the anonymous identification data and creates a loyalty account within the payment terminal.

To this end, the payment terminal comprises, in addition to the buffer memory 31, communications means such as network communications means, data transmission means and data transmission circuits for transmitting data between the various components of the payment terminal.

These means can take the form of a particular processor implemented within the payment terminal. According to one particular embodiment, this device implements a particular application that is in charge of carrying out transactions, this application being for example provided by the manufacturer of the processor in question in order to enable the use of said processor. To this end, the processor comprises unique identification means. These unique identification means ensure the authenticity of the processor.

Besides, the device also comprises near-field communications or NFC means and means for transmitting and receiving data from communications networks. These means also take the form of communications interfaces enabling the exchange of data on the communications networks, interrogation means and database updating means.

The invention claimed is:

1. A method for processing, comprising:
   processing locally within a payment terminal comprising a general-purpose processor, a secured processor and a secured processing memory, the processing comprising:
   obtaining, by the secured processor, at least one piece of data representing a bank card or a smartphone wallet called a payment means used, by a user, to carry out a transaction, the at least one piece of data being called a piece of payment means data;
   anonymizing, by the secured processor, said piece of payment means data, delivering a piece of current anonymous identification data;
   transmitting said piece of current anonymous identification data from the secured processor to an application for processing loyalty data of the payment terminal, said application for processing loyalty data being executed by the general-purpose processor of the payment terminal;
   the general-purpose processor of the payment terminal transmitting, to the secured processor, the piece of current anonymous identification data and at least one piece of data representing loyalty for said user associated with the piece of current anonymous identification data;
   creating, by the secured processor, a container comprising a container identifier and data derived from the piece of current anonymous identification data and from said at least one piece of data representing loyalty; and
   transmitting, by the payment terminal via a wireless communication channel of the payment terminal, said container to a smartphone of the user.

2. The method for processing according to claim 1, wherein transmitting said piece of anonymous identification data to the application for processing loyalty data is accompanied by transmission of a piece of data representing a transaction amount.

3. The method for processing according to claim 1, wherein anonymizing said piece of payment means data comprises:
   application, by the secured processor, of a hash processing operation; and
   application, by the secured processor, of a cryptographic processing operation.

4. The method for processing according to claim 1, further comprising processing the piece of current loyalty data by the application for processing loyalty data, said processing comprising:
   searching, within a data structure, for a piece of reference anonymous identification data corresponding to the piece of current anonymous identification data; and
   when said searching delivers a positive result, updating the piece of loyalty data associated with the piece of current anonymous identification data; and
   when the searching delivers a negative result, creation, within the data structure, of the piece of loyalty data associated with the piece of current anonymous identification data.

5. The method for processing according to claim 1, further comprising:
   reception, from the communications terminal, of a piece of data for identifying said communications terminal; and
   updating a recording of a loyalty data structure associated with the piece of current anonymous identification data, comprising association of the piece of data for identifying said communications terminal with the piece of current anonymous identification data.

6. The method for processing according to claim 1, further comprising, subsequently to the transmission of the piece of current anonymous identification data, printing out a payment receipt comprising the at least one piece of data representing loyalty.

7. The method for processing according to claim 1, wherein the piece of anonymous identification data is unique to the payment terminal.

8. The method for processing according to claim 1, wherein the secured processor anonymizes the piece of payment means data using a public key of the payment terminal.

9. The payment terminal according to claim 1, wherein the secured processor anonymizes the piece of payment means data using a public key of the payment terminal.

10. A payment terminal comprising:
    a general purpose processor;
    a general purpose processor memory storing an application for processing loyalty data of the payment terminal, which is executable by the general processor;
    a secured processor;
    a secured processing memory,
    wherein the secured processor is configured to locally:
        obtain at least one piece of data representing a bank card or a smartphone wallet called a payment means used, by a user, to make a transaction, the at least one piece of data being called a piece of payment means data;
        anonymize said piece of payment means data, delivering a piece of current anonymous identification data; and
        transmit said current anonymous identification data from the secured processor to the application for processing loyalty data that is executable by the general processor of the payment terminal;
    wherein the general processor is configured by the application for processing loyalty data to transmit, to the secured processor, the piece of current anonymous identification data and at least one piece of data representing loyalty for said user associated with the piece of current anonymous identification data; and
    wherein the secured processor is configured to:
        create, by the secured processor, a container comprising a container identifier and data derived from the piece of current anonymous identification data and from said at least one piece of data representing loyalty; and
        transmit, via a wireless communication channel of the payment terminal, said container to a smartphone of the user.

11. The payment terminal according to claim 10, wherein the piece of anonymous identification data is unique to the payment terminal.

12. At least one non-transitory computer-readable medium comprising program code instructions for executing a method, when the instructions are executed on a secured processor and a general purpose processor of a payment terminal, wherein the method comprises:

locally processing transactional data by the payment terminal with the general-purpose processor and the secured processor of the payment terminal by:

obtaining, by the secured processor, at least one piece of data representing a bank card or a smartphone wallet called a payment means used, by a user, to carry out a transaction, the at least one piece of data being called a piece of payment means data;

anonymizing, by the secured processor, said piece of payment means data, delivering a piece of current anonymous identification data;

transmitting said piece of current anonymous identification data from the secured processor to an application for processing loyalty data of the payment terminal, said application for processing loyalty data being executed by the general-purpose processor of the payment terminal;

the general-purpose processor of the payment terminal transmitting, to the secured processor, the piece of current anonymous identification data and at least one piece of data representing loyalty for said user associated with the piece of current anonymous identification data;

creating, by the secured processor, a container comprising a container identifier and data derived from the piece of current anonymous identification data and from said at least one piece of data representing loyalty; and transmitting, by the payment terminal via a wireless communication channel of the payment terminal, said container to a smartphone of the user.

13. The at least one non-transitory computer-readable medium according to claim 12, wherein the piece of anonymous identification data is unique to the payment terminal.

14. The at least one non-transitory computer-readable medium according to claim 12, wherein the secured processor anonymizes the piece of payment means data using a public key of the payment terminal.

\* \* \* \* \*